United States Patent [19]

Stanko

[11] Patent Number: 5,213,285
[45] Date of Patent: May 25, 1993

[54] ROTATING AIRCRAFT TIRE/LANDING GEAR APPARATUS

[76] Inventor: John J. Stanko, 327 Coraopolis Rd., Coraopolis, Pa. 15108

[21] Appl. No.: 867,154

[22] Filed: Apr. 10, 1992

[51] Int. Cl.⁵ .............................................. B64C 25/40
[52] U.S. Cl. ................................................ 244/103 S
[58] Field of Search .................. 244/103 S; 152/209 R

[56] References Cited

U.S. PATENT DOCUMENTS

| | | | |
|---|---|---|---|
| 2,383,662 | 8/1945 | McClaskey | 244/103 S |
| 3,529,792 | 9/1970 | MacMahon | 244/103 S |
| 3,568,747 | 3/1971 | Fletcher et al. | 244/103 S |
| 3,773,283 | 11/1973 | Abplanalp | 244/103 S |
| 3,814,354 | 6/1974 | Reese | 244/103 S |
| 4,061,294 | 12/1977 | Hawkins | 244/103 S |
| 4,385,739 | 5/1983 | Soderberg | 244/103 S |

FOREIGN PATENT DOCUMENTS

| | | | |
|---|---|---|---|
| 909090 | 4/1946 | France | 244/103 S |
| 912891 | 8/1946 | France | 244/103 S |
| 1015091 | 8/1952 | France | 244/103 S |
| 545929 | 7/1956 | Italy | 244/103 S |
| 3262 | 2/1908 | United Kingdom | 244/103 S |
| 2071589 | 9/1981 | United Kingdom | 244/103 S |
| 3125419 | 1/1983 | United Kingdom | 244/103 S |
| 2193932 | 2/1988 | United Kingdom | 244/103 S |

Primary Examiner—Joseph F. Peters, Jr.
Assistant Examiner—Anne E. Bidwell
Attorney, Agent, or Firm—Walter J. Blenko, Jr.; George K. Stacey

[57] ABSTRACT

An aircraft tire and an associated landing gear apparatus which rotate a wheel of a landing aircraft prior to contact between the wheel and a runway. The tire possesses an array of projections which have a forward face for catching air and which are molded into the tire in at least one channel circling the tire tread on at least one sidewall of the tire. The tire preferably possesses one or more belts underneath those projections situated in channels to protect the integrity of the tire's shape. A landing gear apparatus which may be used in conjunction with the aircraft tire comprises a duct mounted adjacent to the tire which receives air, reroutes it, and releases it into at least some of the forward faces of the projections so as to effect a further forward rotational force on the tire and wheel.

17 Claims, 4 Drawing Sheets

ROTATING AIRCRAFT TIRE/LANDING GEAR APPARATUS

BACKGROUND OF THE INVENTION

1. Field Of The Invention:

The present invention relates generally to aircraft tires and associated landing gear apparatuses which rotate a wheel of a landing aircraft prior to contact between the wheel and a runway.

2. Description Of The Prior Art:

Prior to impact with a runway, the wheels of a landing aircraft are not rotating. When the wheels meet the runway, they must quickly accelerate to match the speed of the aircraft. Until they match this speed, the runway abrades rubber from the tires. As a result, the aircraft's tires must be repaired or replaced frequently. The rubber abraded from the tires is deposited on the runway as a long skid mark. These rubber deposits build up over repeated landings and must be periodically removed.

One method of alleviating these problems is to rotate a landing aircraft's wheels prior to the wheels contacting a runway. Various apparatuses for rotating an aircraft wheel or wheels prior to landing have been suggested.

U.S. Pat. No. 3,529,792 discloses an aircraft tire provided with wedge-shaped bar structures on the sidewalls thereof. Impingement of the air flow on front bar faces at the bottom of the tire sets the wheels to rotating prior to touchdown of the aircraft.

U.S. Pat. No. 3,773,283 discloses an aircraft tire with circumferential grooves in the tread face. The grooves include as the floor thereof a series of impeller vanes defined by assymmetrical wedges which present differential resistance to the airstream at vertically opposed locations on the tire and cause the tire to be rotated by the airstream.

U.S. Pat. No. 3,814,354 discloses a power operated device associated with the conventional landing gear of an aircraft for causing rotation of the landing wheels of the aircraft by the airstream moving past the aircraft prior to landing and while still airborne.

U.S. Pat. No. 4,061,294 discloses an aircraft wheel rotator. The rotator provides an air collector which is similar to a plow and which forces air outwardly and downwardly to impinge on the spokes of the landing wheel with which the air collector is associated. The spokes are formed as the blades of a turbine to be driven by the air from the air collector.

U.S. Pat. No. 4,385,739 discloses a system for causing an airborne vehicle's wheels to rotate prior to contacting the runway surface upon landing. Means are provided for diverting a stream of air from an aircraft's engines or other sources against the radially spaced surfaces of the mechanical housings which are affixed to the wheels. This forces the wheels to rotate.

Means for rotating aircraft wheels have also been disclosed to alleviate other problems associated with aircraft landings. U.S. Pat. No. 3,568,747 discloses an improved form of pneumatic aircraft tire which may assist in avoiding several problems associated with landing on a wet runway. The pneumatic tire comprises a tread portion and two shoulder portions, at least one of which is provided with a plurality of generally radial and axially outwardly extending faces projecting into the region adjacent to the tire shoulder. The faces are disposed so that they will be engaged by water on the runway and decrease the relative velocity of the tread portion and the surface during landing.

In spite of these known systems, there remains a need for a commercially acceptable apparatus for rotating a wheel of a landing aircraft prior to contact between the wheel and a runway.

SUMMARY OF THE INVENTION

The present invention provides an aircraft tire and an associated landing gear apparatus. Molded into the tire is an array of projections. The projections are situated in at least one circumferential channel within the tire tread and are preferably also situated on at least one sidewall of the tire.

Those projections located on the sidewalls of the tire preferably extend axially no further than the widest part of the tire and radially no further than the level of the tire tread. Those projections located within a circumferential channel preferably extend radially no further than the level of the tire tread. In this way, when the tire is in contact with the runway, there is minimal contact between the projections and the runway so that the projections are protected from excessive wear.

The projections have a forward face and a body which extends back from the forward face. The forward face of a projection may be a variety of shapes, such as, for example, arched, semicircular, rectangular, or trapezoidal, and is preferably concave. The upper edge of the forward face may extend out over the base edge of the forward face or may recede back from the base edge.

The height of the body of a projection gradually declines as the body extends back from the forward face. The body stops at a point where it is level with the sidewall or channel floor. In a preferred embodiment, the width of the body of a projection also gradually declines as the body extends back from the forward face.

Each projection is oriented so that its forward face faces the front of the aircraft when the projections are on the lower portion of the tire. In this way, the forward faces of projections on the lower portion of the tire catch air flowing past the tire and effect a forward rotational force on the tire and wheel. The gradual slopes of the bodies of the projections on the upper portion of the tire deflect impinging air so that any reverse rotational force on the tire and wheel is slight.

In the preferred embodiment, the tire also has one or more circular belts or cables. The belts or cables are preferably steel and are situated underneath those projections which are located within the circumferential channels, and over or between the tire's plies. The belts or cables protect the integrity of the tire's shape which could otherwise be compromised by an impact with the runway or by the aircraft's weight and which could result in damage to the tire.

The tire may be used by itself but is preferably used in conjunction with the landing gear apparatus. The landing gear apparatus comprises a duct which is mounted adjacent to the tire and is preferably mounted above the tire. The duct has an intake opening facing the front of the aircraft which receives air delivered by the ram effect of the aircraft traveling through the air. The interior of the duct is a hollow chamber which reroutes the air received by the intake opening towards the surface of the tire in a forward rotational direction. The duct also has one or more discharge openings which release the rerouted air into at least some of the projections' forward faces. The forward faces catch the released air and effect a further forward rotational force on the tire and wheel.

The interior of the duct may also contain one or more passageways to separate the air traveling through the chamber into individual streams. In a preferred embodiment, the passageways are of decreasing cross-sectional area. This causes the air to accelerate and directs the air towards specific positions on the tire where projections may be situated. The accelerated air increases the forward rotational force on the tire and wheel.

A portion of the duct is preferably positioned to shield the upper half of the tire from impinging air and to deflect the impinging air into the intake opening. This prevents air flowing past the upper half of the tire from acting as a reverse rotational force on the tire and wheel and also increases the receipt of air by the intake opening.

It will be appreciated that multiple copies of the present invention may be used in conjunction to rotate all the wheels of a multiple wheel assembly.

It will be further appreciated that multiple copies of the present invention may be used in conjunction to rotate all the wheels of a landing aircraft.

DESCRIPTION OF THE PREFERRED EMBODIMENTS

As used in this Application, "Forward rotational direction" means a direction in which the tire is required to rotate for landing.

As used in this Application, "Forward rotational force" means a force causing tire rotation in the direction required for landing.

As used in this Application, "Reverse rotational force" means a force causing tire rotation in the direction opposite of that required for landing.

As used in this Application, "circumferential" means circling the tire.

Figure 1A:
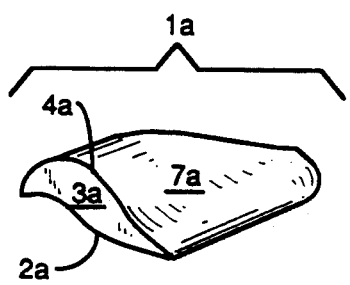
FIG. 1A is a schematic illustration of a preferred embodiment of a projection which may be situated on a sidewall.
Figure 1B:
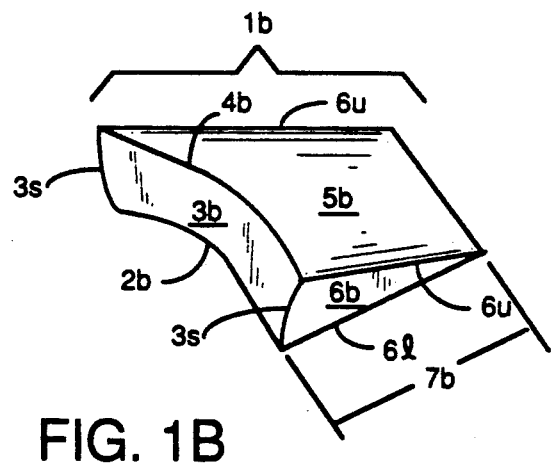
FIG. 1B is a schematic illustration of a preferred embodiment of a projection which may be situated in a circumferential channel within the tire tread.

As shown in FIGS. 1A and 1B, each projection has a forward face $3a$ and $3b$ and a body $7a$ and $7b$ which extends back from the forward face $3a$ and $3b$. The preferred form of those projections 1a situated on a sidewall is shown in FIG. 1A. The forward face $3a$ of the projection $1a$ is concave. The base edge $2a$ of the forward face $3a$ forms a curved line which is skewed towards that side of the projection $1a$ closest to the tire tread. The upper edge $4a$ of the forward face $3a$ forms an arch which begins at one side of the base edge $2a$ of the forward face $3a$ and extends to the other side of the base edge $2a$ of the forward face $3a$. The arch formed is skewed to the side of the projection $1a$ closest to the tire tread. The upper edge $4a$ of the forward face $3a$ extends out over the base edge $2a$ of the forward face $3a$ to form a shallow cup. The height and width of the body $7a$ of the projection 1a decreases as the body extends backward so as to form a smooth mound.

The preferred form of those projections $1b$ located in circumferential channels within the tire tread is shown in FIG. 1B. The forward face $3b$ of the projection $1b$ is concave. The base edge $2b$ of the forward face $3b$ forms a curved line. The outer edges $3s$ of the forward face $3b$ extend upward and outward from the base edge $2b$ of the forward face $3b$ to the upper edge $4b$ of the forward face $3b$. The upper edge $4b$ of the forward face $3b$ forms a curved line which is generally parallel to the curved line formed by the base edge $2b$ of the forward face $3b$. The concave forward face $3b$ slants forward from its base edge $2b$ to its upper edge $4b$. The upper edge $4b$ extends out beyond the base edge $2b$ forming a shallow cup. The body $7b$ of the projection $1b$ extends backward from the frontal face $3b$ forming a top surface $5b$ and two side surfaces $6b$. The top surface $5b$ is trapezoidal and its height decreases steadily to the surface of the channel. The side surfaces $6b$ are triangular and slant outward from their base edge 61 to their upper edge $6u$.

Figure 3:
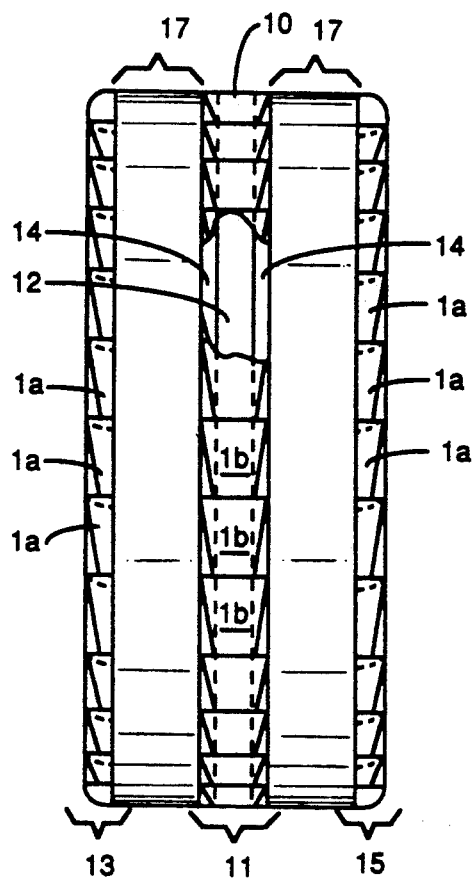
FIG. 3 is a front view of a preferred embodiment of the tire arrayed with projections with a small cut-away showing the channel empty of projections.

A preferred array of projections $1a$ and $1b$ molded into a tire 9 is shown in FIG. 3. The tire 9 possesses three circumferential rows 11, 13 and 15 of projections $1a$ and $1b$. One row 11 of projections $1b$ is situated in a circumferential channel 10 which lies within the middle of the tire tread 17. A second row 13 of projections $1a$ is situated on the outer edge of one of the sidewalls of the tire 9. A third row 15 of projections 1a is situated on the outer edge of the remaining sidewall of the tire 9. As illustrated in the cut-away portion of FIG. 3, the channel 10 has a flat bottom surface 12 and two walls 14 which slope outwards until they meet the tire tread 17. The projections $1b$ in channel 10 sit on the flat bottom surface 12 of the channel 10, and their sloped sides $6b$ are flush with the sloped walls 14 of the channel 10. The projections $1b$ in channel 10 extend radially less far than the tire tread 17. The projections 1a arrayed in the remaining rows 13 and 15 extend axially no further than the widest point on the tire 9 and radially less far than the tire tread 17. Each projection $1a$ and $1b$ is oriented so that its forward face $3a$ and $3b$ faces the front of the aircraft when the projection $1a$ and $1b$ is on the lower portion of the tire 9.

Figure 5:
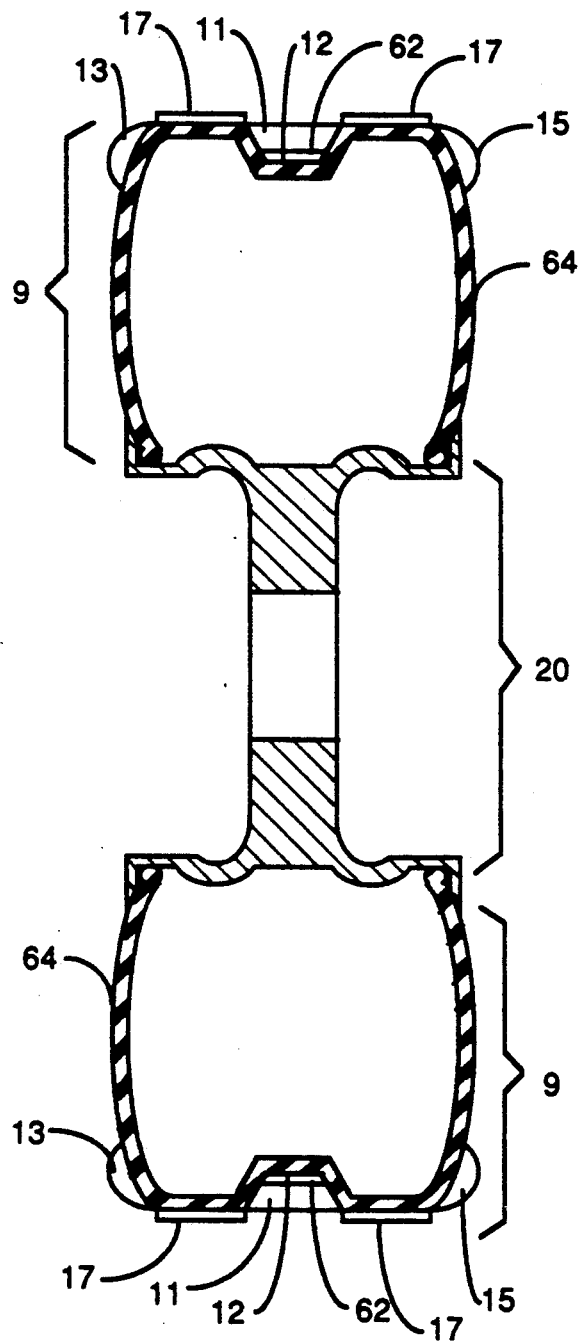
FIG. 5 is a frontal cross-section of the preferred form of the tire.
Figure 6:
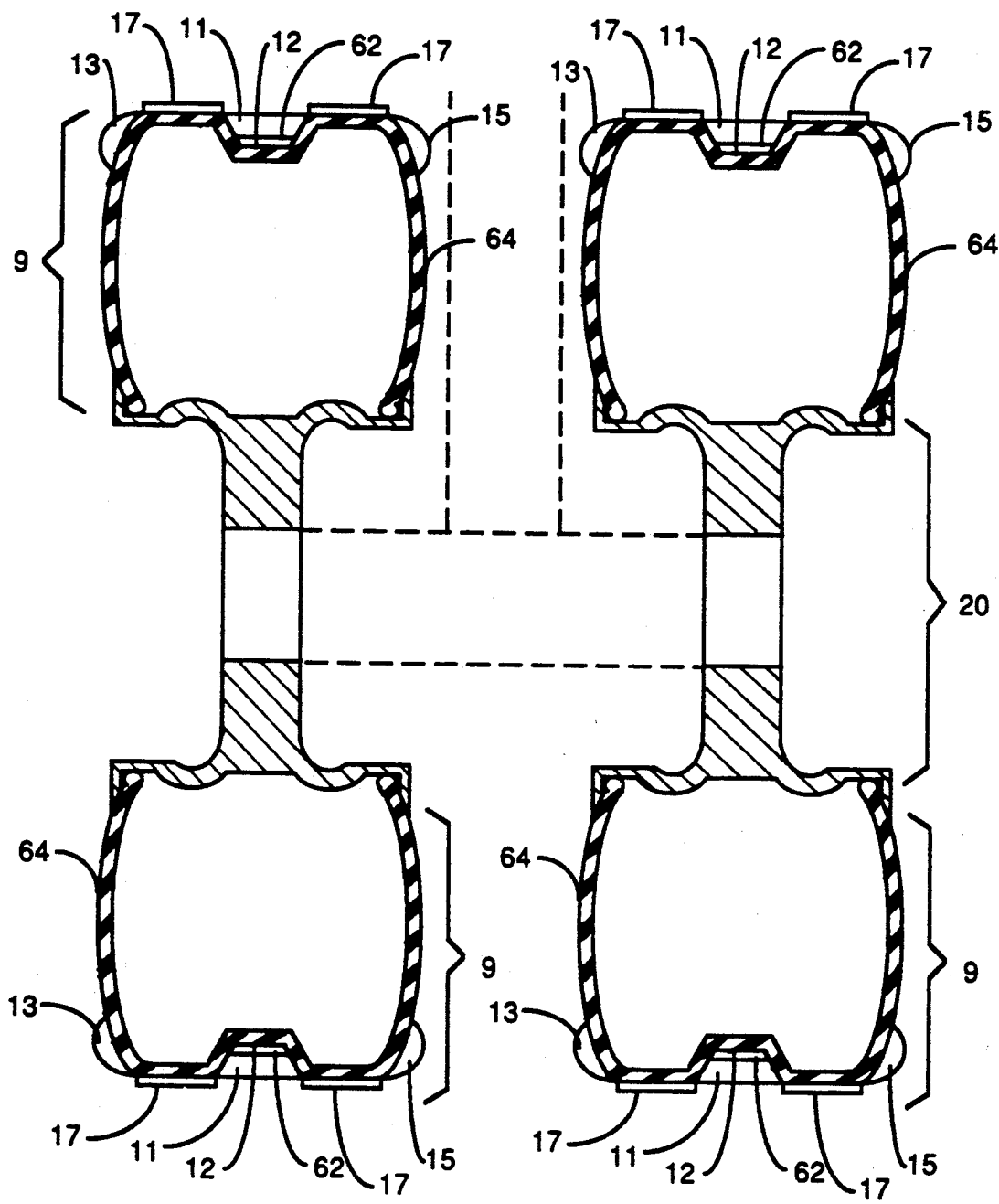
FIG. 6 is a frontal cross-section of a multiple wheel assembly of the tire.

FIG. 5 shows a frontal cross-section of the preferred form of tire 9. A circular belt 62 is situated directly underneath the central row 11 of projections 1b and surrounds the tire's plies 64. The plies 64 may be made of standard materials well known to those skilled in the art. The belt 62 is about the width of the bottom surface 12 of the channel 10. The belt 62 may be made of standard materials well known to those skilled in the art and is preferably steel. FIG. 6 shows a frontal cross-section of the preferred form of tire 9 on a multiple wheel assembly.

Figure 2:
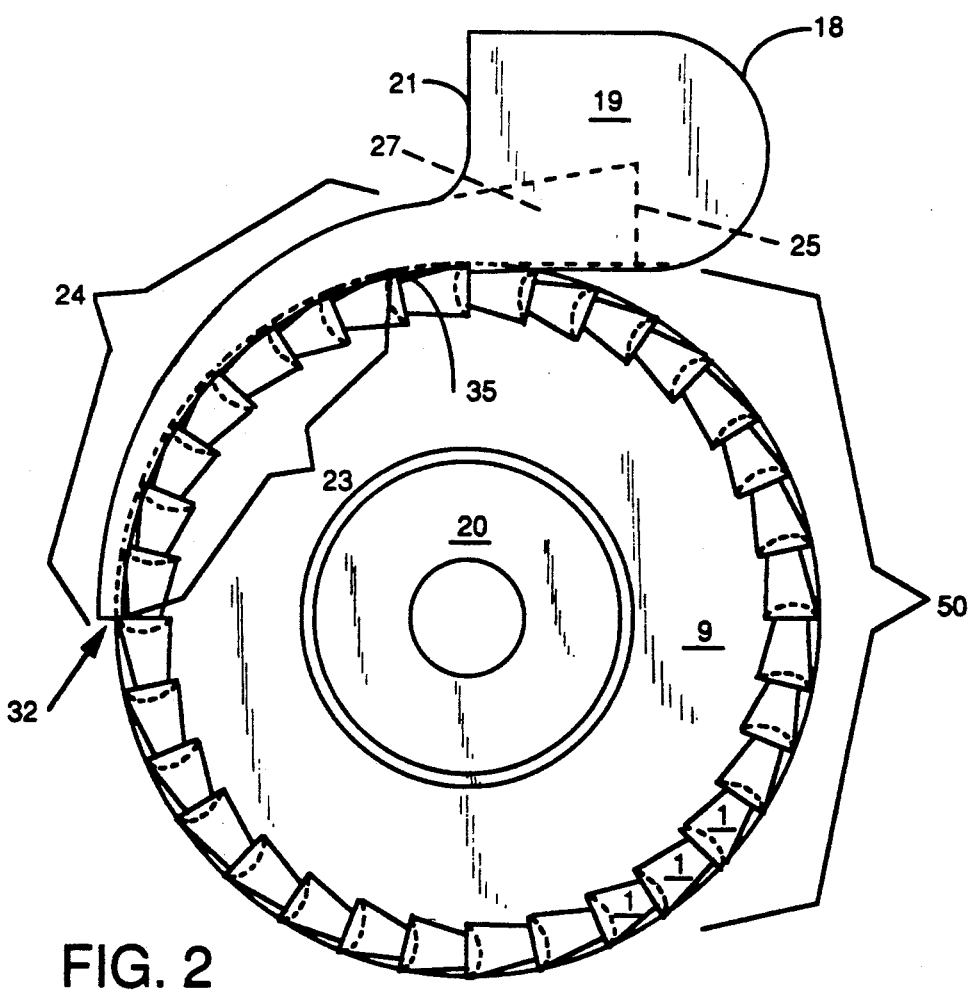
FIG. 2 is a side view of a preferred embodiment of the duct and the tire arrayed with projections, with the passageways contained in the duct shown by a hatched line.

A preferred form of the duct is shown in FIG. 2. The duct 18 is mounted above the tire 9. The duct 18 has an intake opening 21 which is positioned above the tire 9 and above the hub 20 of the wheel 50. The intake opening 21 faces the front of the aircraft.

The interior of the duct 18 is a hollow chamber 19. The chamber 19 extends a distance from the intake opening 21 towards the back of the aircraft. It then curves downward towards the tire 9 and forward towards the front of the aircraft. Finally, the chamber 19 extends with the lower portion 24 of the duct 18 forward and downward so that it covers the upper half of the tire 9 which faces the front of the aircraft.

Figure 4:
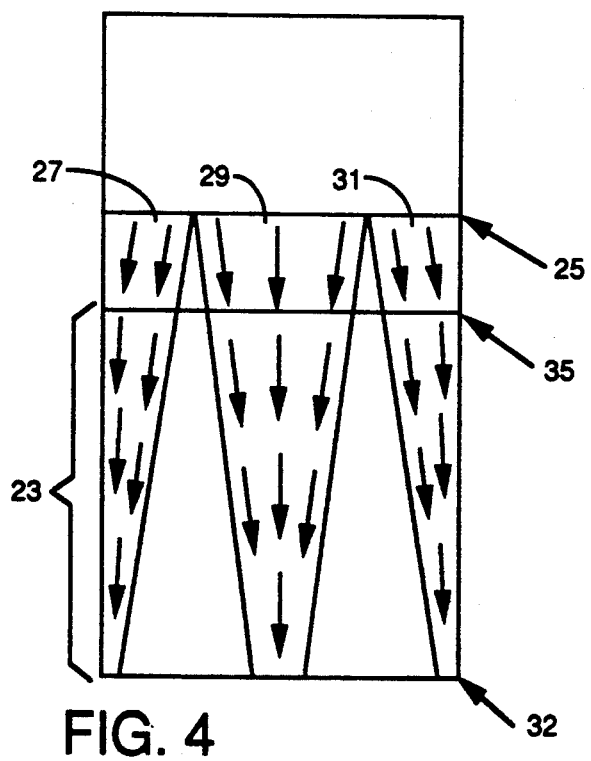
FIG. 4 is a bottom view schematic illustration of a preferred embodiment of the duct containing three passageways.

At a point 25 within the chamber, three passageways 27, 29 and 31 begin. FIG. 4 shows a bottom view schematic of a preferred embodiment of the duct containing three passageways 27, 29 and 31. The passageways 27, 29 and 31 are of decreasing cross-sectional area from the point 25 where they begin to the point 32 where they end at the bottom of the duct 18. Each passageway 27, 29 and 31 narrows to an area above one of the three rows 11, 13 and 15 of projections 1a and 1b.

At a point 35 above the upper half of the front of the tire 9, a discharge opening 23 begins. The discharge opening 23 extends over the entire surface of the duct 18 which faces the tire 9 from the point 35 where the discharge opening begins to the point 32 where it ends at the bottom of the duct 18. For the entire extent of the discharge opening, the passageways 27, 29 and 31 are open to the tire 9.

The preferred embodiment of the present invention which is disclosed above operates as follows: When the landing gear is lowered for landing, it is exposed to the oncoming air. Air flowing past the lower portion of the tire 9 is caught by the forward faces 3a and 3b of the projections 1a and 1b on the lower portion of the tire 9, which causes a forward rotational force on the tire and wheel.

The ram effect of the aircraft traveling through the air delivers air into the intake opening 21. This air flows through the chamber 19 where it is rerouted downward and to the front of the tire 9 in a forward rotational direction At a point 25, the air enters into the three passageways 27, 29 and 31 where it is accelerated by the passageways' decreasing cross-sectional area. The passageways 27, 29 and 31 direct the air to positions adjacent to the three rows 11, 13 and 15 of projections 1a and 1b on the tire 9.

The accelerated air is released by the discharge opening 23 into the three rows 11, 13 and 15 of projections 1a and 1b. The forward faces 3a and 3b of the projections 1a and 1b catch the air, causing a further forward rotational force on the tire 9 and wheel 50. This further forward rotational force acts in combination with the forward rotational force caused by air being caught by the projections 1a and 1b on the lower portion of the tire 9.

The upper half of the tire 9 is shielded from impinging air by the lower portion 24 of the duct 18. This shielding prevents the impinging air from acting as a reverse rotational force on the upper portion of the tire 9. The impinging air is deflected by the lower portion 24 of the duct 18 into the intake opening 21. This increases the delivery of air to the intake opening 21 and, therefore, to the projections 1a and 1b, causing a further forward rotational force on the tire 9 and wheel 50. This further forward rotational force acts in combination with the forward rotational forces disclosed above.

The combined forces rotate the tire 9 and wheel 50 quickly and efficiently. The wheel 50 will be rotating when it contacts the runway, reducing or eliminating rubber abrasion from the tire 9 and rubber buildup on the runway. The belt 62 protects the integrity of the tire's shape. The projections 1a and 1b have minimal contact with the runway and are therefore protected from excessive wear.

Whereas particular embodiments of the present invention have been described above, for purposes of illustration, it will be evident to those skilled in the art that numerous variations of the details may be made without departing from the invention as defined in the appended claims.

What is claimed is:

1. A rotating aircraft tire, comprising:
   an array of projections for catching air molded into the tire and situated in at least one circumferential channel within the tire thread so as to protect the projections from excessive wear, which projections have a forward face and a body of gradually decreasing height and width which extends back from the forward face, and which forward faces face the front of the aircraft when on the lower portion of the tire so as to catch air flowing past the tire and effect a forward rotational force on the tire and wheel.

2. The rotating aircraft tire of claim 1,
   wherein additional projections are also situated on at least one sidewall of the tire.

3. The rotating aircraft tire of claim 1, further comprising:
   at least one circumferential belt situated beneath those projections located within channels to protect the integrity of the tire's shape.

4. The rotating aircraft tire of claim 3, wherein the belts are steel.

5. An apparatus for rotating a wheel of a landing aircraft prior to contact between the wheel and a runway, comprising:
   a tire having an array of projections for catching air molded into the tire and situated within at least one circumferential channel within the tire tread so as to protect the projections from excessive wear, which projections have a forward face and a body of generally decreasing height which extends back from the forward face, and which forward faces face the front of the aircraft when on the lower portion of the tire so as to catch air flowing past the tire and effect a forward rotational force on the tire and wheel; and
   a duct mounted adjacent to the tire and comprising an intake opening facing the front of the aircraft to receive air delivered by ram effect of the aircraft traveling through the air, a hollow chamber to reroute the air received by the intake opening towards the surface of the tire in a forward rotational direction, and one or more discharge openings to release the rerouted air into the forward faces of at least some of the projections, so as to effect a further forward rotational force on the tire and wheel.

6. The apparatus of claim 5, further comprising:
   at least one circumferential belt situated beneath those projections located within channels to protect the integrity of the tire's shape.

7. The apparatus of claim 6, wherein the belts are steel.

8. The apparatus of claim 7, wherein the duct contains one or more passageways for separating air traveling through the chamber into individual streams.

9. The apparatus of claim 8, wherein
the one or more passageways are of decreasing cross-sectional area so as to effect acceleration of the air traveling through the passageways and to direct the air towards specific positions on the tire.

10. The apparatus of claim 9, wherein
at least a portion of the duct is positioned to shield the upper half of the tire from impinging air and to deflect the impinging air into the intake opening.

11. The apparatus of claim 10, wherein
the intake opening is positioned above the wheel and the chamber reroutes air received by the intake opening downward and to the front of the tire.

12. The apparatus of claim 11, wherein
the projections are also situated on at least one sidewall of the tire.

13. The apparatus of claim 12, used in conjunction with other such apparatuses in a multiple wheel assembly.

14. The apparatus of claim 12, wherein
the bodies of the projections decrease in width as they extend back from the projections' forward faces.

15. The apparatus of claim 14, wherein
the projections are arrayed in three circumferential rows, one situated in a channel in the middle of the tire tread and one situated on the outer edge of each sidewall, and the duct contains (1) a passageway which directs air to a position adjacent to the row of projections situated in the channel within the middle of the tire tread, (2) a passageway which directs air to a position adjacent to the row of projections situated on the outer edge of one sidewall, and (3) a passageway which directs air to a position adjacent to the row of projections situated on the outer edge of the other sidewall.

16. The apparatus of claim 15, wherein
the tire has one circumferential belt which is about the width of a bottom surface of the channel and is situated in the channel directly underneath the central row of projections and over one or more plies.

17. The apparatus of claim 16, wherein
the belt is steel.

* * * * *